Figure 1:
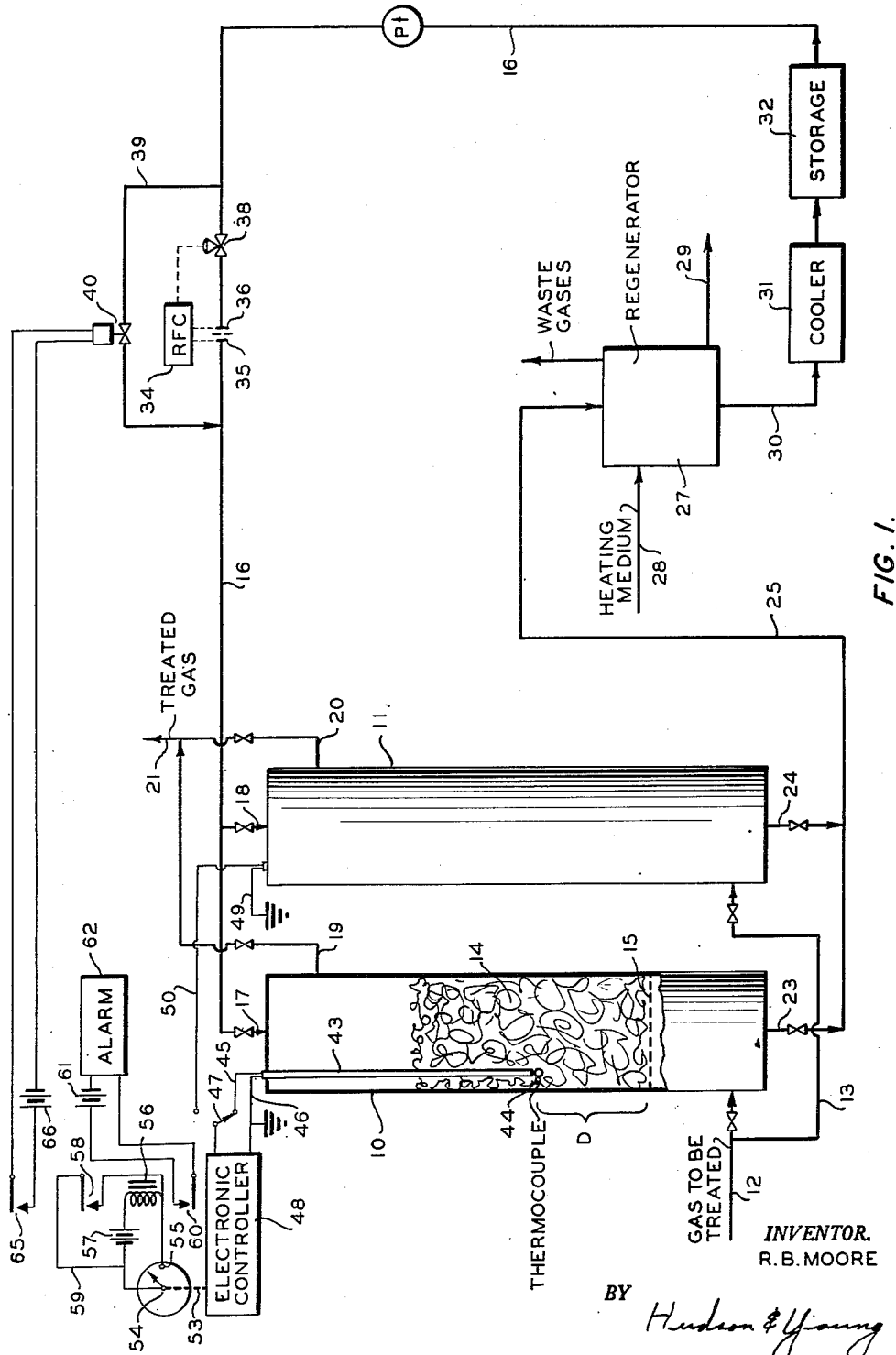

INVENTOR.
R. B. MOORE

United States Patent Office 2,799,851
Patented July 16, 1957

2,799,851

CONTROL AND INDICATING SYSTEM FOR SCRUBBING GASES WITH SCRUBBER LIQUOR

Robert B. Moore, Washington, D. C., assignor to Phillips Petroleum Company, a corporation of Delaware Application May 24, 1954, Serial No. 431,861

3 Claims. (Cl. 340—237)

This invention relates to an indicating system for detecting faulty operation of a scrubber wherein carbon dioxide, carbon monoxide and other materials are removed by an ammoniacal copper solution from a stream containing nitrogen and hydrogen. In another aspect, it relates to an indicating and control system for such scrubber. In still another aspect, it relates to an absorption vessel of improved construction provided with a temperature-determining element.

In the synthesis of ammonia from mixtures of hydrogen and nitrogen, a raw synthesis gas is prepared containing hydrogen and nitrogen, usually in stoichiometric proportions for the formation of ammonia, together with carbon monoxide and carbon dioxide, this raw synthesis gas being produced, for example, from methane and air. This gas is ordinarily subjected to a catalytic reforming operation wherein the bulk of the carbon monoxide is converted to carbon dioxide, and the carbon dioxide is then removed by scrubbing with water or other suitable material.

Even after such treatment, however, there is some carbon monoxide left in the synthesis gas, and it is important that this material be removed prior to the catalytic reaction of the nitrogen and hydrogen to form ammonia, as carbon monoxide is an effective poisoning agent for the catalyst used in the ammonia synthesis reaction.

One way in which the residual carbon monoxide together with carbon dioxide is removed commercially is by treating the gas passing from the carbon dioxide scrubber with an ammoniacal copper liquor which, in its reduced state, can be represented by the following formula: $Cu(NH_3)_n{}^+R^-$ and, in the cupric state, by the equation $Cu(NH_3)_{2n}{}^{++}R^{--}$ where $n$ is a small integer, such as 2, and R represents a suitable ion, such as the formate or carbonate ion. At low temperatures, this material, hereafter referred to as copper liquor, has the property of absorbing carbon dioxide and carbon monoxide from the synthesis gas. After thus absorbing carbon dioxide or carbon monoxide, the copper liquor can be regenerated by heating it, whereupon the oxides of carbon are released and the copper liquor, after cooling, is ready for reuse in the absorption zone.

In the past, difficulties have arisen in the operation of such scrubbers resulting in insufficient absorption of the carbon monoxide or carbon dioxide from the ammonia synthesis gas. This has serious results upon the operation of the ammonia synthesis system since even small amounts of carbon monoxide have a definite and deleterious poisoning effect upon the ammonia synthesis catalyst.

In particular, insufficient absorption may occur as a result of increased carbon monoxide or carbon dioxide concentration in the inlet gas, a decrease in ammonia or cuprous copper concentration in the liquor, or a decreased flow rate of the copper liquor through the absorption vessel. Insufficient absorption of the carbon monoxide resulting from any of these causes is difficult to detect, and may result in poisoning of the synthesis catalyst unless prompt corrective action is taken. While poor regeneration of the copper liquor or insufficient cooling thereof can also result in insufficient absorption, these difficulties seldom result in poisoning of the synthesis catalyst since they occur infrequently, and can be readily detected with the control instrumentation ordinarily provided in such systems.

However, insufficient absorption resulting from any of the first four causes is very difficult to detect, and often results in poisoning or damage to the synthesis catalyst before the trouble is detected in commercial operation.

It is an object of this invention to provide an indicating system which will promptly warn the operator of a copper liquor scrubber of an increased concentration of carbon monoxide or carbon dioxide in the inlet gas, a decrease in ammonia or copper concentration in the copper liquor, or a lack of sufficient copper liquor flow for the volume of gas being treated.

It is a further object of the invention to provide an automatic control system which will temporarily alleviate the condition causing insufficient absorption, and promptly warn the operator so that the condition can be remedied, thus avoiding poisoning of the ammonia synthesis catalyst.

A further object of the invention is to provide an absorption vessel of improved character embodying a temperature sensing device.

Figure 2:
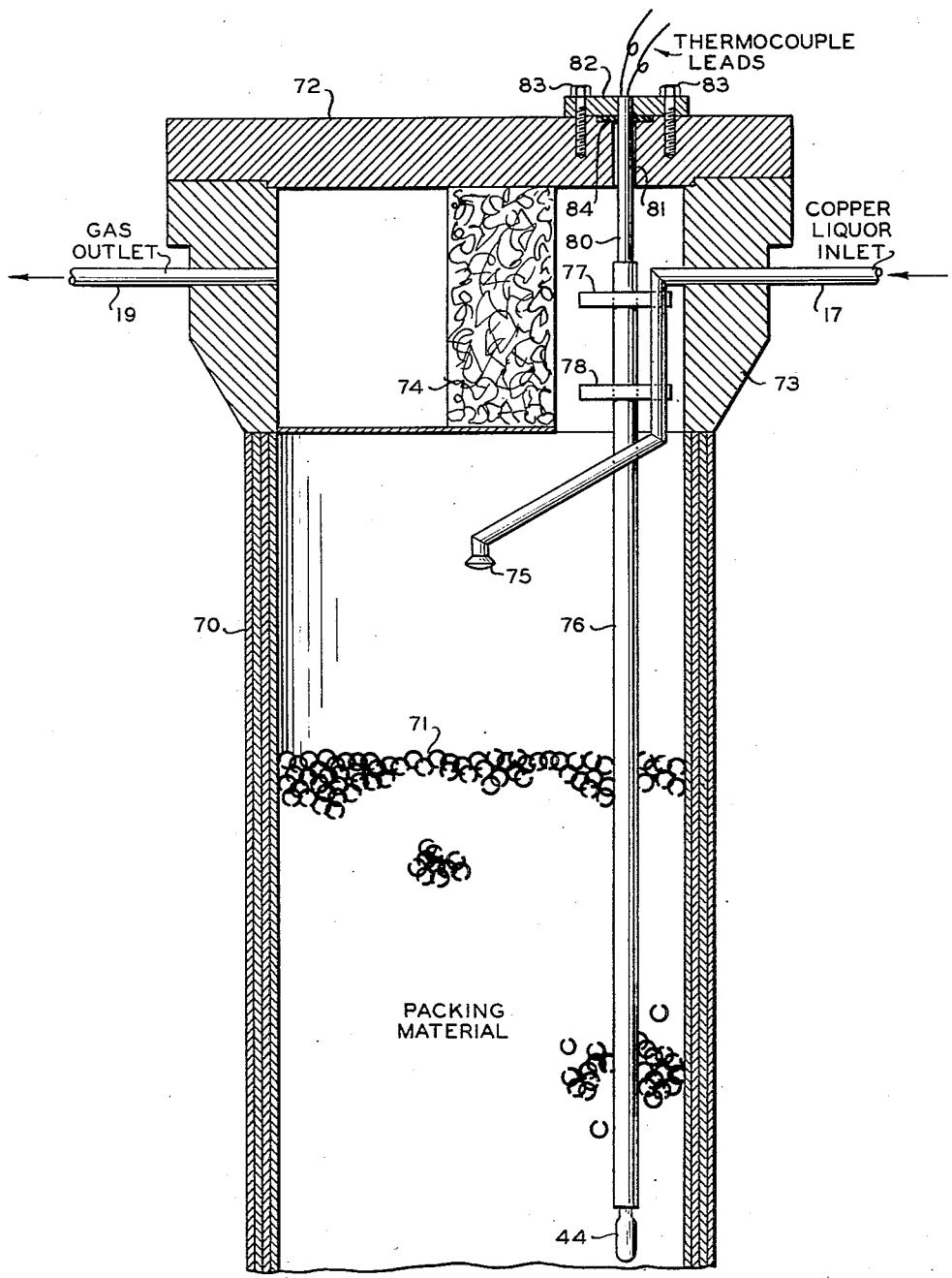

Various other objects, advantages and features of the invention will become apparent from the following detailed description taken in conjunction with the accompanying drawings, in which:

Figure 1 is a flow diagram of a copper liquor scrubbing sytem embodying the indicating and control system of the invention; and Figure 2 is a vertical sectional view of the top portion of the absorption vessel constructed in accordance with the invention.

Referring now to the drawings in detail, and particularly Figure 1, I have shown an absorption system including two absorption towers 10 and 11, the detailed construction of which will be hereinafter set forth in detail. It will be understood that, although two absorption vessels are shown, the principles of the invention are applicable to absorption systems including one, three, or even more absorption vessels, as will become apparent to those skilled in the art. The gas to be treated, which is a mixture of hydrogen and nitrogen, usually in stoichiometric proportions for the formation of ammonia, and containing carbon monoxide, carbon dioxide, and possibly some oxygen is fed through a valved line 12 to the vessel 10 and through a valved line 13 to the vessel 11. The vessels 10 and 11 are preferably packed columns and, as shown in connection with vessel 10, contain suitable packing material 14, such as Raschig rings or Beryl saddles, which are supported adjacent the bottom of the column by a grid 15.

Regenerated copper liquor from a conduit 16 enters the vessels 10 and 11 through valved lines 17 and 18, respectively. In the absorption vessels 10 and 11, the acsending impure synthesis gas is contacted with countercurrently flowing copper liquor solution, treated gas leaving the vessels 10 and 11 through valved lines 19 and 20, respectively, and passing through a conduit 21 to a suitable utilization system, such as an ammonia synthesis unit.

The spent copper liquid leaves the vessels 10 and 11 through valved lines 23 and 24, respectively, from which the spent liquor passes through a conduit 25 to a regenerator 27. A heating medium enters the regenerator 27 through a line 28 and leaves through a line 29, the heating medium passing in indirect heat exchange relation to the spent copper liquor in the regenerator to cause evolution of the carbon monoxide and carbon dioxide absorbed from the synthesis gas stream. These gases pass through a conduit to a stack or other suitable disposal. The regenerated copper liquor emerges from the vessel 27 through a line 30 and passes to a cooler 31 and a storage vessel 32. From the vessel 32, the regenerated liquid passes to conduit 16, the rate of flow being determined by a controller 34 having a pair of flow sensing units 35 and 36 mounted at the opposite sides of an orifice in the conduit 16. A motor valve 38 in conduit 16 is actuated by the controller 34 to maintain a predetermined rate of flow of the copper liquor through the absorption vessels 10 and 11.

A conduit 39 by-passes the controller 34 and valve 38, this conduit having a solenoid valve 40 disposed therein which controls the flow of material therethrough. This valve is closed in normal operation of the system, but is opened automatically when insufficient absorption of the carbon oxides from the synthesis gas takes place in the vessels 10 and 11, as will be explained in detail hereafter.

I have discovered that, when insufficient absorption of the carbon oxides takes place, a temperature rise results in the bed of packing material 14 in the absorption vessel at a definite and predeterminable distance from the bottom of the absorption bed. Such a temperature change takes place as a result of increased carbon monoxide or carbon dioxide concentration in the inlet gas, a decrease in the ammonia concentration of the copper liquor, a decrease in the copper content of the liquor, or a lack of sufficient copper liquor flow to take care of the quantity of synthesis gas passing through the absorption vessel. Any of these conditions can, in accordance with the invention, be remedied temporarily by increasing the rate of flow of copper liquor through the system. Also, at the time the condition causing insufficient absorption occurs, an alarm is sounded so that the condition can be promptly remedied before the temporary correction effected by increasing the flow of copper liquor becomes ineffective.

Accordingly, in each of the vessels 10 and 11, I have provided a pipe 43 which extends downwardly into the absorption vessel to a predetermined distance D from the bottom of the bed of packing material. A thermocouple 44 is mounted at the bottom of the pipe 43 to sense the temperature in the packing at this point. The thermocouple 44 is connected by leads 45 and 46, together with a switch 47 to an electronic controller 48. Switch 47 is operable to connect the input circuit of electronic controller 48 to a similar thermocouple, not shown, in vessel 11 which has leads 49 and 50 connected thereto. Switch 47 can be sequentially operated, in accordance with the invention, to sequentially monitor the temperature a selected distance above the bottom of the bed of absorption material in the respective absorption vessels.

The controller 48 has a shaft 53, the angular position of which is representative of the temperature sensed by the thermocouple unit connected thereto. Attached to shaft 53 is a pointer 54 which is engageable with a contact 55 when the temperature sensed by the thermocouple exceeds a predetermined value. The pointer 54 and contact 55 are connected in circuit with the operating winding of a relay 56 and a battery 57, the relay 56 being provided with a holding circuit through a set 58 of normal open relay contacts, and a lead 59.

The relay 56 has an additional set of normally open contacts 60 which are connected in circuit with a battery 61 and an alarm 62, such as a bell or whistle. Finally, relay 56 has a set 65 of normally open contacts which are connected in circuit with a battery 66 and the operating winding of the solenoid valve 40.

In one commercial installation, the packing 14 is 20 feet in depth, and the thermocouple 44 is located approximately 10 feet from the top of the bed. The inlet temperature of the copper liquor is approximately 0° C., and the outlet temperature is between 16° and 20° C. During normal operation, the temperature mid-way between the end of the packing is less than 12° C. but, when insufficient absorption occurs, due to the causes already stated, the temperature rises above 12° C. at this region. Thus, in this particular installation, controller 48 is set to close the circuit between indicator 54 and contact 55 when the temperature exceeds 12° C. at the thermocouple.

In the operation of the system, relay 56 is deenergized, and pointer 54 is not in engagement with contact 55, due to the fact that the temperature of thermocouple 44 is below 12° C. However, should there be an increase in the carbon monoxide or carbon dioxide concentration in the inlet gas, a decrease in ammonia or copper concentration in the copper liquor or a lack of sufficient copper liquor flow to effectively absorb the oxides of carbon from the synthesis gas, the temperature at thermocouple 44 rises above the predetermined value of 12° C. As a result, the operating circuit of relay 56 is closed, and remains closed due to the action of the holding circuit 57, 58 and 59. Responsive to the energization of relay 56, the alarm 62 is actuated through closure of contacts 60, and solenoid valve 40 is opened by actuation of contacts 65. Accordingly, due to the fact that line 39 is larger than conduit 16, there is a substantial increase in flow of copper liquor to the scrubbing vessel.

It is a feature of the invention that the operation of the indicating and control system is so rapid that the condition causing insufficient absorption can be readily corrected before any gas can leave the absorption vessel which is contaminated with carbon monoxide or carbon dioxide. Alternatively, if the automatic control feature of the system is not utilized, an alarm 62 is sounded in time for the operator to correct the condition, again before any of the gas contaminated with carbon monoxide or carbon dioxide can leave the absorption vessel.

It will be noted that, with two absorption vessels, switch 47 can be automatically actuated to alternately transfer the connection of electronic controller to the thermocouple 44 and vessel 10 and to the similar thermocouple in vessel 11. Controller 48 automatically indicates which thermocouple was connected thereto when operation of the automatic control system takes place.

Accordingly, I have achieved the objects of my invention in permitting insufficient absorption to be promptly and automatically detected, and the condition corrected before the contaminated gas leaves the absorption vessel. As previously noted, no warning or control action is provided by the system where the cause of insufficient absorption is poor regeneration of the copper liquor or insufficient cooling thereof. However, such conditions can be readily detected by the normal instrumentalities to permit them to be corercted before contaminated gas leaves the absorber.

As stated, with a 20 foot bed, in one commercial installation, the thermocouple has been located half-way down in the bed, i. e., 10 feet from the bottom of the bed. Of course, the optimum point of location on the thermocouple varies with different installations, and the proper location can be readily determined experimentally. In some cases, the defined temperature control can be effected by measuring the temperature differential across the top half of the packing or across the bottom half of the packing, or alternatively, the temperature differential between the top and bottom of the packing. However, the results obtained with such modifications, while of value where the normal temperature of treatment is subject to considerable fluctuation, are not to be preferred where the normal treatment temperature remains stable.

In Figure 2, I have shown an improved absorption vessel provided with a thermowell and a thermocouple of the character described in connection with Figure 1. This vessel includes a cylindrical laminated wall 70 within which is disposed packing material 71. A heavy cover plate 72 is secured to the head 73 of the vessel, and the gas outlet conduit 19 protrudes laterally through the head 73 and is connected with a mist extractor 74 through which the treated gases pass out of the system. The copper liquor inlet 17 also protrudes laterally through the head 73, and communicates with a spray nozzle 75 located centrally of the cross section of the vessel.

A thin walled tube 76 is secured to the shell of the vessel by supports 77 and 78, this tube extending about half-way down into the packing material 71. A thermowell 80 is mounted concentrically within the tube 76 and extends to the bottom thereof where the thermocouple 44 is located. The thermowell 80 extends through an opening 81 formed in the cover plate 72, and it is received within a flange 82 secured to the cover by bolts 83. A sealing gasket 84 is interposed between the flange 82 and the cover 72. Thus, the thermowell extends vertically from the top of the vessel down into the packing in an area not occupied by the mist extractor 74. In this manner, it is not necessary to provide an opening through the laminated and stress relieved sides of the vessel 70, and it is not, of course, possible to insert the thermocouple through the inlet or outlet pipe, which would necesitate a 90° bend in the thermowell, and prohibit installation of the thermocouple. However, with the installation, as shown, extremely satisfactory results are obtained, no difficulty is encountered in properly sealing the vessel, and the thermocouple can be readily inserted into place or removed for repair or replacement.

While the invention has been described in connection with a present, preferred embodiment thereof, it is to be understood that this description is illustrative only and is not intended to limit the invention.

I claim:

1. An indicating and control system for a copper scrubber which comprises, in combination, an absorption vessel, packing material in said vessel, a source of gas including nitrogen, hydrogen, carbon monoxide, and carbon dioxide, means for feeding gas from said source to the bottom of said absorption vessel, an effluent line connected to the top of said absorption vessel to withdraw gaseous effluent therefrom, a regenerator, a valved line connected to the bottom of each absorption vessel and communicating with the inlet of said regenerator, means for passing a heating medium in indirect heat exchange with the material in said regenerator, a conduit connecting the outlet of said regenerator to the top of said absorption vessel, means for circulating copper liquor through said vessel, said regenerator, and said conduit, a rate of flow controller in said conduit to provide a predetermined rate of flow of copper liquor to said vessel, a line by-passing said rate of flow controller, a solenoid valve in said by-pass line, a thermocouple positioned in the packing material of said absorption vessel, an electronic controller, means for connecting said thermocouple to the input of said electronic controller, a relay, an indicator connected to said controller and responsive to the output thereof, a contact engageable by said indicator, a circuit including said indicator, said contact, a current source, and the operating winding of said relay, a holding circuit connected to the operating winding of said relay, said relay having two sets of normally open contacts, an alarm, a circuit including a current source connecting said alarm in circuit with one of said sets of normally open contacts, and a circuit including a current source connecting the solenoid of said valve with the other set of normally open relay contacts.

2. An indicating and control system for a copper scrubber which comprises, in combination, an absorption vessel, packing material in said vessel, a source of gas including nitrogen, hydrogen, carbon monoxide, and carbon dioxide, means for feeding gas from said source to the bottom of said absorption vessel, an effluent line connected to the top of said absorption vessel to withdraw gaseous effluent therefrom, a regenerator, a valved line connected to the bottom of said absorption vessel and communicating with the inlet of said regenerator, means for passing a heating medium into indirect heat exchange with the material in said regenerator, a conduit connecting the outlet of said regenerator to the top of said absorption vessel, means for circulating copper liquor through said vessel, said regenerator, and said conduit, a rate of flow controller in said conduit to provide a predetermined rate of flow of copper liquor to said vesesl, a line by-passing said rate of flow controller, a solenoid valve in said line, a thermocouple positioned in the packing material in said absorption vesesl, an electronic controller, means for connecting said thermocouple to the input of said electronic controller, an alarm actuated by said electronic controller, and a circuit connecting the output of said controller to said solenoid valve, said controller actuating said alarm and opening said solenoid valve when the thermocouple temperature rises above a predetermined value.

3. An indicating and control system for a copper scrubber which comprises, in combination, an absorption vessel, packing material in said vessel, a source of gas including nitrogen, hydrogen, carbon monoxide, and carbon dioxide, means for feeding gas from said source to the bottom of said absorption vessel, an effluent line connected to the top of said absorption vessel to withdraw gaseous effluent therefrom, means for withdrawing spent copper liquor from the bottom of said vessel, regenerating said spent copper liquor, and feeding it to the top of said absorption vessel, a thermocouple positioned in the packing material in said absorption vessel, an electronic controller, means for connecting said thermocouple to the input of said electronic controller, means controlling the rate of flow of regenerated copper liquor to said vessel, an alarm, and a circuit connecting the output of said controller to said controlling means and said alarm, said controller energizing said alarm and increasing said rate of flow of copper liquor when the temperature of said thermocouple rises above a predetermined value.

References Cited in the file of this patent

UNITED STATES PATENTS

| 1,088,611 | Neubauer | Feb. 24, 1914 |
| 1,578,666 | Katz | Mar. 30, 1926 |
| 1,992,747 | Gilliland et al. | Feb. 26, 1935 |
| 2,047,550 | Dely | July 14, 1936 |
| 2,400,923 | Farr et al. | May 28, 1946 |